United States Patent [19] [11] 4,192,262
Ohoda et al. [45] Mar. 11, 1980

[54] CONTROL SYSTEM FOR VARYING THE AMOUNT OF SCAVENGING AIR TO BE ADMITTED TO INTERNAL COMBUSTION ENGINE

[75] Inventors: Michio Onoda, Yokohama; Yasuo Nakajima, Yokosuka; Kunihiko Sugihara; Shin-ichi Nagumo, both of Yokohama, all of Japan

[73] Assignee: Nissan Motor Company, Limited, Yokohama, Japan

[21] Appl. No.: 867,599

[22] Filed: Jan. 6, 1978

[30] Foreign Application Priority Data

Jan. 8, 1977 [JP] Japan .................................. 52-965

[51] Int. Cl.$^2$ ......................... F02D 39/02; F02M 7/00
[52] U.S. Cl. .................................. 123/75 B; 123/26; 123/119 D
[58] Field of Search ............... 123/75 B, 76, 119 D, 123/124 R, 26

[56] References Cited

U.S. PATENT DOCUMENTS

| 2,818,931 | 1/1958 | Mallory | 123/75 B |
| 3,739,797 | 6/1973 | Caldwell | 123/119 A |
| 3,908,618 | 9/1975 | Tange et al. | 123/75 B |
| 3,976,039 | 8/1976 | Henault | 123/26 |
| 4,060,061 | 11/1977 | Might | 123/75 B |
| 4,083,338 | 4/1978 | Bertling et al. | 123/124 R |
| 4,088,101 | 5/1978 | Wakita | 123/119 D |

FOREIGN PATENT DOCUMENTS 47-43366 11/1972 Japan .
51-116321 11/1976 Japan .

Primary Examiner—Charles J. Myhre
Assistant Examiner—M. Moy
Attorney, Agent, or Firm—Schwartz, Jeffery, Schwaab, Mack, Blumenthal & Koch

[57] ABSTRACT

A control system is adapted for an internal combustion engine in which a jet of air is injected into each combustion chamber via a second intake valve during each exhaust cycle and the subsequent intake cycle. The system comprises a source of compressed air having a pressure to be varied in accordance with the engine speed, an injection passageway leading from the source toward each second intake valve and a flow controller operated in accordance with changes in intake manifold vacuum. The flow controller includes a scheduled flow area therethrough to increase, under conditions in which the engine speed is constant, the amount of air passing through the injection passageway in accordance with increasing engine load in such a way as to increase the ratio of air flow through the injection passageway to the intake air flow to the engine under light engine load in order to cope with increasing residual gas fraction within each combustion chamber when the engine idles or operates under deceleration of the vehicle.

5 Claims, 4 Drawing Figures

CONTROL SYSTEM FOR VARYING THE AMOUNT OF SCAVENGING AIR TO BE ADMITTED TO INTERNAL COMBUSTION ENGINE

BACKGROUND OF THE INVENTION

This invention relates to an engine system including a four cycle internal combustion engine in which compressed air is admitted to each combustion chamber via a second intake valve during a period overlapping each exhaust stroke and the subsequent intake stroke, and more particularly to a control system for varying the amount of air to be admitted to such an internal combustion engine.

One engine system is known in which an air fuel mixture is admitted to a combustion chamber by a first intake valve during an intake cycle and air is admitted to the combustion chamber by a second intake valve during the intake cycle to swirl around the cylinder axis to produce a stratified charge comprising an ignitable cloud in the proximity of the electrode of a spark plug.

In another known engine system, an air fuel mixture is admitted to a combustion chamber by a first intake valve to swirl around the cylinder axis during an intake cycle and air is admitted to the combustion chamber by a second intake valve during the intake cycle to swirl within a plane substantially parallel to the axial plane containing the cylinder axis therein to bring about fast stable combustion. In this engine, the second intake valve is arranged so as to direct a jet of air toward the electrode of a spark plug to scavenge the same.

Still another engine system is known in which an air fuel mixture is admitted to a combustion chamber by a first intake valve during an intake cycle to swirl around the cylinder axis in one direction and air is admitted to the combustion chamber by a second intake valve during the initial stage of the intake cycle to swirl around the cylinder axis, but in the opposite direction to produce a stratified charge comprising an ignitable cloud in the proximity of the electrode of a spark plug.

In these engine systems described in the preceding, under idling or deceleration conditions when a great deal of residual gas exists within a combustion chamber, smooth engine operation could not be expected because the air-fuel ratio supplied to the engine is set lean and a great deal of residual gas within the combustion chamber will dilute the intake charge under these conditions.

The admission of air in these engines is effected by a second intake valve and under atmospheric pressure, and no precise control of the amount of air to be admitted is effected which might lead to excessive deviation of the air-fuel ratio within the combustion chamber from a certain optimum range.

Another engine system is known in which air is admitted to a combustion chamber during the last stage of a compression cycle so as to prevent excessive rise in heat within the combustion chamber and the admission of air is again effected during the last stage of the subsequent exhaust cycle to absorb heat from an exhaust valve and the electrode of a spark plug. In this engine system a source of compressed air is used for the admission of air.

In another known engine system, the admission of air is effected during the last stage of an expansion or combustion cycle and the subsequent exhaust cycle for the purpose of promoting oxidation of HC and CO contained in the exhaust gases.

In any one of the engine systems described in the preceding, however, the performance, in power output and fuel consumption, at full load operating conditions of the engine is not sufficient, requiring further improvement.

It is proposed, in still another known engine system, to admit scavenging air to a combustion chamber during an exhaust cycle so as to expel the residual gas out of the combustion chamber. Although, in this engine system, the scavenging is carried out, it is impossible to lean out the air fuel mixture.

SUMMARY OF THE INVENTION

An object of the invention is to control the amount of compressed air to be admitted to each combustion chamber through each second intake valve during each exhaust cycle and the subsequent intake cycle in such a way that the amount of compressed air will be varied in accordance with the engine load and also with the engine speed.

Another object of the invention is to control compressed air flow supplied to second intake valves of the engine by the provision of pump means producing compressed air having an increasing pressure with increases in the engine speed and by the provision of a flow controller operated in accordance with changes in intake manifold vacuum and including a variable geometry flow path therethrough scheduled to open so as to increase, under conditions in which the engine speed is constant, the compressed air flow supplied to the engine in accordance with increases in engine load in such a way as to increase the ratio of compressed air flow supplied to the engine to the intake air flow under light engine load.

DESCRIPTION OF THE PREFERRED EMBODIMENTS

Figure 1:
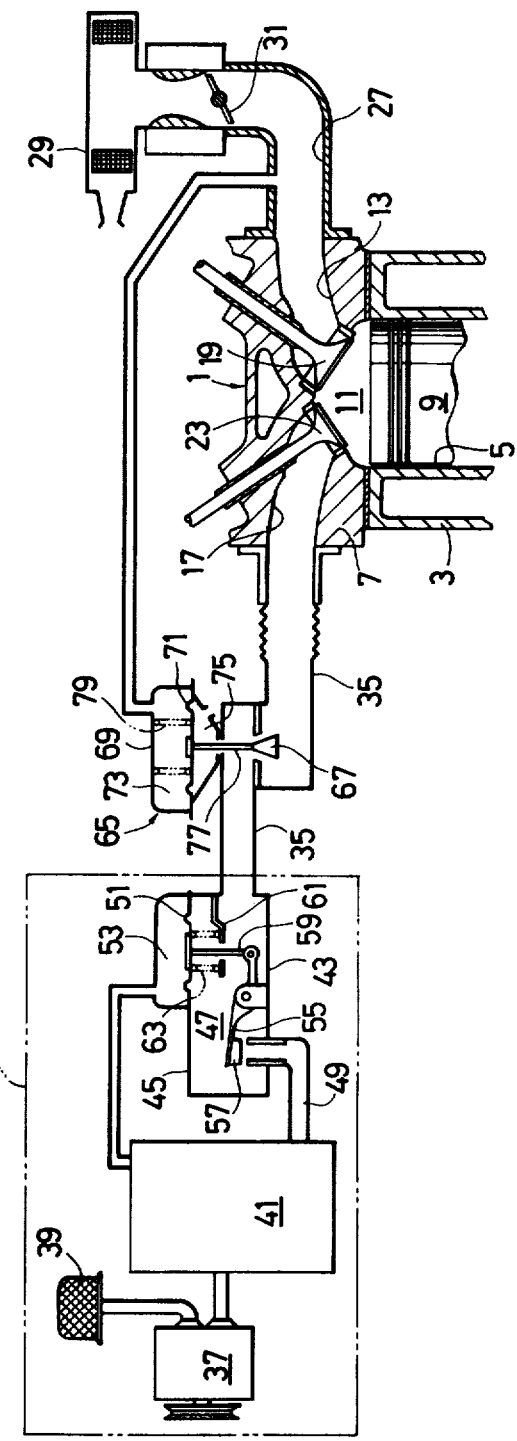
FIG. 1 is a diagrammatic view of a flow control system for varying the amount of compressed air supplied to an internal combustion engine for the admission of air to each combustion chamber of the engine during each exhaust cycle and the subsequent intake cycle.
Figure 2:
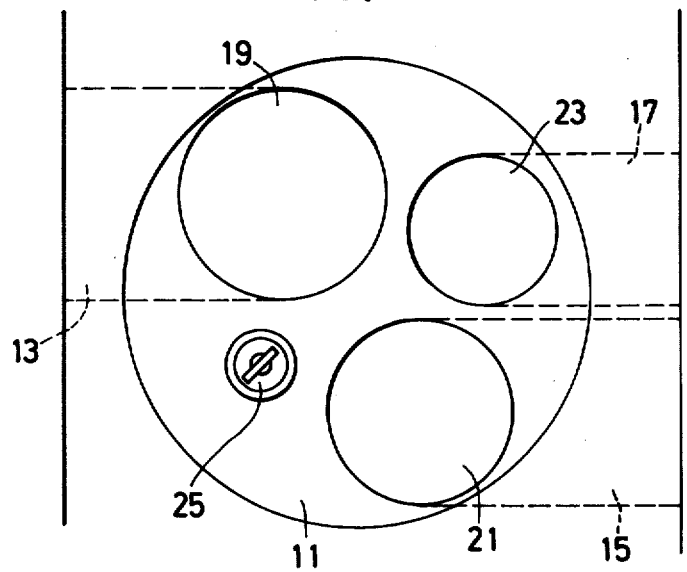
FIG. 2 is a top view of a valve arrangement of a cylinder of the engine.

Referring to the drawings and particularly to FIG. 1, an engine system illustrated herein comprises a four cylinder internal combustion engine 1 having a cylinder block 3 formed with a plurality of cylinders, only one being shown at 5, and a cylinder head 7 to close the cylinders. Each cylinder 5 has a piston 9 reciprocating therein and piston 9, cylinder 5 and cylinder head 7 cooperate to define a combustion chamber 11. Cylinder head 7 has a first intake port passage 13, an exhaust port passage 15 (see FIG. 2) and a second intake port passage 17, all of which are open to combustion chamber 11. Supported by cylinder head 7 are first intake valve 19 closing first intake port passage 13, an exhaust valve 21 (see FIG. 2) closing exhaust port passage 15 and a second intake valve 23 closing second intake port passage 17. First intake valve 19 is adapted to open to perform an intake cycle, while, exhaust valve 21 is adapted to open to perform an exhaust cycle and their opening timings are substantially similar to those of a four cycle conventional internal combustion engine having a single intake valve and a single exhaust valve. Designated by the reference numeral 25 is the electrode of a spark plug (see FIG. 2).

An induction passage 27 leads from an air cleaner 29 toward cylinder head 7 to connect with each first intake port passage 13 and has a carburetor throttle valve 31 therein to control the flow of air therethrough.

Second intake valve 23 is adapted to open during a period overlapping each exhaust cycle and the subsequent intake cycle to effect admission of air to combustion chamber 11. More particularly, the valve opening of second intake valve 23 commences during the last stage of each exhaust cycle and terminates during the initial stage of the subsequent intake cycle.

A source of compressed air 33 is provided to supply compressed air having a pressure which increases with increases in the engine speed to each second intake port passage 17 through an injection passageway 35. Source of compressed air 33 includes an air pump 37 having an air cleaner 39, a surge tank 41 communicating with air pump 37 to receive air therefrom and a pressure regulator (reducer) 43. Air pump 37 is drivingly connected to engine 1 to supply compressed air increasing in pressure with increases in the engine speed to surge tank 41. Pressure regulator 43 is a device by which the output pressure of air discharged therefrom is regulated to a reduced pressure of the input pressure. It includes a housing 45 formed with a regulating chamber 47 to which injection passageway 35 is open. An inlet conduit 49 leads from surge tank 41 into regulating chamber 47 to establish communication between surge tank 41 and regulating chamber 47. A diaphragm member 51 is mounted within housing 45 to separate from regulating chamber 47 a pressure chamber 53 communicating with surge tank 41 to receive the internal pressure therein. A lever 55 is pivotally mounted within regulating chamber 47 and has an arm provided with a valve member 57 adapted to close the influx port of inlet conduit 49 and an opposite arm operatively connected to diaphragm member 51 through a connecting rod 59. A spring retainer 61 is fixedly mounted within regulating chamber below diphragm member 51 (viewing in FIG. 1) to receive one end of a bias spring 63. Spring 63 biases diaphragm member 51 upwardly to lift connecting rod 59 toward a position in which lever 55 urges valve member 57 to close the influx port of inlet conduit 49, while, when the pressure difference between a pressure within pressure chamber 53 and a pressure within regulating chamber 47 increases to such a degree as to cause diaphragm member 51 to overcome the biasing force of spring 63, diaphragm member 51 urges connecting rod 59 to move downwardly (viewing in FIG. 1) toward a position in which lever 55 urges valve member 57 to disengage from and open the influx port of inlet conduit 49. The pressure difference as valve member 57 closes the influx port of inlet conduit 49 will take place because air within regulating chamber 47 will flow into each combustion chamber 11 through injection passageway 35 as second intake valve 23 opens.

Figure 4:
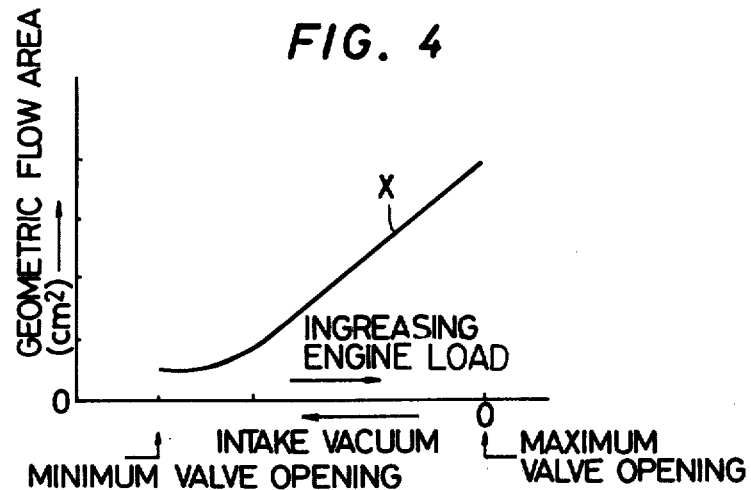
FIG. 4 is a graph showing the relationship of a scheduled flow area in accordance with the invention.

The amount of air passing through injection passageway 35 is controlled by a flow controller 65 having a flow control valve 67 fluidly disposed in injection passageway 35 intermediate pressure regulator 45 and cylinder head 7. As shown by a curve X in FIG. 4, flow controller 65 has a valve opening therein continuously varied in accordance with intake manifold vacuum or intake in such a way that the valve opening increases as the intake manifold vacuum decreases.

Flow control valve 67 is operable by a vacuum motor 69 in the form of a diaphragm device. Vacuum motor 69 has a diaphragm member 71 which separates a vacuum chamber 73 from an atmospheric chamber 75, the latter opening to the ambient atmosphere. Vacuum chamber 73 is connected to induction passage 27 downstream of carburetor throttle valve 31 to receive intake manifold vacuum. Diaphragm 71 is fixedly connected to flow control valve 67 through a connecting rod 77 extending into atmospheric chamber 75. A spring 79 is mounted within vacuum chamber 73 to bias diaphragm member 71 toward atmospheric chamber 75 to move connecting rod 77 downwardly (viewing in FIG. 1) toward a position in which the valve opening is maximum, while, as the intake manifold vacuum increases, diaphragm member 71 will urge connecting rod 77 upwardly toward a position in which the valve opening is minimum.

Figure 3:
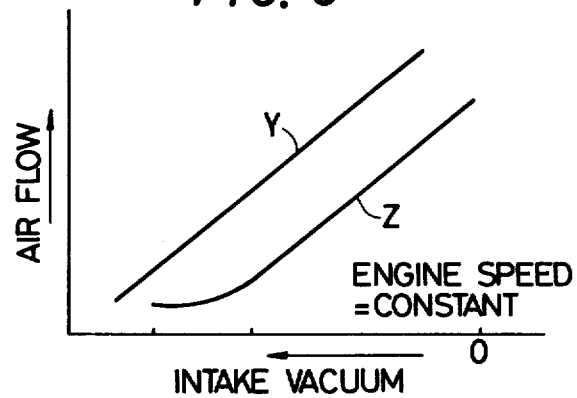
FIG. 3 is a graph showing the relationship of the intake air flow to the engine and the compressed air flow to the engine in the engine system shown in FIG. 1 when the engine operates at the same speed but at different engine loads.

Referring to FIG. 3, a curve Y shows intake air flow through induction passage 27 to engine 1 versus intake manifold vacuum and a curve Z shows compressed air flow through injection passage 35 past flow control valve 67 versus intake manifold vacuum. Both of these curves are drawn with engine 1 operating at the same engine speed. As shown by curve Y, the intake air flow increases as the intake manifold vacuum decreases. As shown by curve Z, flow control valve 67 is constructed so as to continually increase compressed air flow through injection passageway 35 upon decreases in intake manifold vacuum (increased engine load) in such a way as to increase the ratio of compressed air flow through injection passageway 35 to intake air flow through induction passage 27 when intake manifold vacuum considerably increases or engine load is considerably light. More particularly, when engine 1 operates at light load as reflected by intake manifold vacuum higher than a predetermined level, such as under idling conditions, in which the residual gas fraction, i.e., a ratio of the residual gas within a combustion chamber to the intake air flow, abruptly increases as compared to the case when the engine operates at heavy load, the ratio of compressed air flow through injection passageway 35 to intake air flow through induction passage 27 is considerably high.

It is also necessary to increase compressed air flow through injection passageway 35 in accordance with increases in the engine speed. As explained before, air pressure from pressure regulator 43 continually increases with increases in the engine speed so that air flow passing through flow control valve 67 will continually increases as the engine speed increases even if the geometric flow path of flow controller 65 is constant. The provision of air pump 37, therefore, makes it possible to increase air flow through injection passageway 35 upon increases in the engine speed, too.

Referring to the relationships of the valve opening timings, first intake valve 19 and exhaust valve 21 open and close in accordance with the valve opening timings substantially similar to the existing internal combustion engine having a single intake valve and an exhaust valve, and the valve opening period of second intake valve 23 will commence during each exhaust cycle and terminate during the subsequent intake cycle. Compressed air will be admitted to combustion chamber 11 through second intake valve 23 during this valve opening period so as to expel the residual gas out of the combustion chamber 11 via exhaust valve 21. Because of this admission of compressed air during this valve opening period, combustion chamber 11 will be scavenged to such an extent that there will remain substantially no residual gas within the combustion chamber 11, thus bringing about a favorable condition for the combustion of a charge in the subsequent power or combustion cycle. This will result or cause stable combustion leading to an increase in power output because misfire probability will decrease considerably.

In order to supply enough compressed air to combustion chamber 11 for reducing the residual gas within combustion chamber 11, compressed air flow through injection passageway 35 is varied in accordance with the intake air flow and also with the engine speed.

Air pump 37 is driven in timed relation with the engine speed and discharges compressed air to surge tank 41 under pressure increasing with increases in the engine speed.

The pressure within surge tank 41 indicative of the engine speed will also be transmitted to pressure chamber 53 and urges diaphragm member 51 against the action of spring 63 tending to move connecting rod 59 downwardly (viewing in FIG. 1) toward a position in which valve member 57 disengages from influx port of inlet conduit 49, permitting influx of compressed air through inlet conduit 49. This causes an increase in pressure within regulating chamber 47 and this increase in pressure will assist the action of spring 63 tending to move connecting rod 59 upwardly toward another position in which valve member 57 seats on the influx port of inlet conduit 49 to prevent influx of compressed air. It will now be noted that the pressure within regulating chamber 47 will increase with increases in the pressure within surge tank 41, that is, indicative of the engine speed, but the magnitude of the former is a reduced with respect to the latter. The reduction could be rendered unnecessary and the use of pressure regulator 45 could be eliminated if the capacity of air pump 37 and its discharge pressure are appropriately tailored to the demanded amount of scavenging air and, demanded pressure upon admission of compressed air to combustion chamber 11. However, the advantage derived from the use of pressure regulator 45 is that a large volume of air can be compressed at high pressure within surge tank 41 and therefore can provide an adequate amount of air with a surge tank having a compact size.

What is claimed is:

1. An engine system comprising:
    an internal combustion engine having a combustion chamber, a first intake port passage opening to said combustion chamber, a second intake port passage opening to said combustion chamber, an exhaust port passage opening to said combustion chamber, a first intake valve closing said first intake port passage and adapted to open to perform an intake cycle, an exhaust valve closing said exhaust port passage and adapted to open to perform an exhaust cycle and a second intake valve closing said second intake port passage and adapted to open during a portion of said exhaust cycle and a portion of the subsequent intake cycle;
    a source of compressed air having a pressure which increases with increases in the engine speed;
    an induction passage connecting with said first intake port passage;
    an injection passageway interconnecting said source of compressed air and said second intake port passage; and
    flow controller means for controlling compressed air flow through said injection passageway in accordance with changes in intake manifold vacuum, said flow controller means including a variable geometry flow path therethrough scheduled to open so as to increase, under conditions in which the engine speed is constant, air flow through said injection passageway in accordance with increases in engine load in such a way as to increase the ratio of compressed air flow through said injection passageway with respect to intake air flow through said induction passage under light engine load.

2. An engine system comprising:
    an internal combustion engine having a combustion chamber, a first intake port passage opening to said combustion chamber, a second intake port passage opening to said combustion chamber, an exhaust port passage opening to said combustion chamber, a first intake valve closing said first intake port passage and adapted to open to perform an intake cycle, an exhaust valve closing said exhaust port passage and adapted to open to perform an exhaust cycle and a second intake valve closing said second intake port passage and adapted to open during a portion of said exhaust cycle and a portion of the subsequent intake cycle;
    a source of compressed air having a pressure which increases with increases in the engine speed;
    an induction passage connecting with said first intake port passage;
    an injection passageway interconnecting said source of compressed air and said second intake port passage; and
    flow controller means for controlling compressed air flow through said injection passageway in accordance with changes in intake manifold vacuum, said flow controller means including a variable geometry flow path therethrough scheduled to open so as to increase, under conditions in which the engine speed is constant, air flow through said injection passageway in accordance with increases in engine load in such a way as to increase the ratio of compressed air flow through said injection passageway with respect to intake air flow through said induction passage under light engine load, wherein said source of compressed air includes a surge tank, air pump means for supplying air to said surge tank under pressure increasing with increase in the engine speed, and pressure regulator means for supplying air to said injection passageway under pressure which is reduced with respect to the pressure of air within said surge tank.

3. An engine system as claimed in claim 2, in which the ratio of compressed air flow through said injection passageway to intake air flow through said induction passage is high when said engine operates at light load as compared to the case when said engine operates at heavy load.

4. An engine system as claimed in claim 2, in which said pressure regulator means comprises a housing formed with a regulating chamber to which said injection passageway is open; a conduit means leading from said surge tank into said regulating chamber to establish communication between said surge tank and said regulating chamber; a lever pivotally mounted within said regulating chamber and having an arm provided with a valve member for closing said conduit means; spring means for biasing said lever toward a position in which said lever urges said valve member to close said conduit means; and a diaphragm means for urging said lever against said spring means toward another position in which said lever urges said valve member to open said conduit means in response to a difference between a pressure within said surge tank and a pressure within said regulating chamber.

5. In an internal combustion engine having a combustion chamber which takes the form of a single discrete variable volume space and an induction system including an induction manifold through which air and fuel flow to said combustion chamber;
 a pump driven by said engine for compressing air;
 a surge tank for storing the air compressed by said pump, said surge tank being fluidly interposed between said pump and said engine;
 an exhaust valve operatively disposed with said engine for exhausting combustion gases from said combustion chamber during the exhaust phase of said engine;
 a first inlet valve operatively disposed with said engine for controlling the fluid communication between said surge tank and said combustion chamber;
 a second inlet valve operatively disposed with said engine for inducting air and fuel from said induction manifold into said combustion chamber during an induction phase of said engine;
 said first inlet valve being selectively openable to permit the introduction of said compressed air into said combustion chamber during the final portion of said exhaust phase to scavenge the residual combustion gases which tend to remain in the combustion chamber after said exhaust phase and during a portion of said induction phase so that compressed air mixes with said air and fuel inducted from said induction manifold and induces the resultant air-fuel charge to swirl in said combustion chamber; and
control valve means in the form of
a pressure control valve unit fluidly interposed between said surge tank and said first inlet valve which releases air from said surge tank at a pressure a predetermined amount below the pressure prevailing in the surge tank; and
a flow control valve fluidly interposed between said pressure control valve unit and said first inlet valve and connected with said induction manifold so as to be responsive to the vacuum prevailing therein, said flow control valve being arranged to control the flow of air between said pressure control valve unit and said first inlet valve according to a schedule whereby the volume of air permitted to flow to said first inlet valve decreases with increase in the vacuum prevailing in said induction manifold and increases with respect to the volume of air passing through said induction manifold.

* * * * *